United States Patent Office 3,093,693
Patented June 11, 1963

3,093,693
1,3-CYCLODODECADIENE AND METHOD OF PREPARATION
Robert H. Perry, Jr., Baytown, Tex., assignor, by mesne assignments, to Esso Research and Engineering Company, Elizabeth, N.J., a corporation of Delaware
No Drawing. Filed Feb. 16, 1961, Ser. No. 89,651
12 Claims. (Cl. 260—666)

The present invention relates to a new composition of matter, 1,3-cyclododecadiene, and a method for making it. The new composition of matter finds utility in the field of polymerization as a building block for polymer formation. It finds further utility in the possession of unsaturated linkages, one of which may be selectively ozonized and oxidized to provide the alpha-omega dicarboxylic grouping while maintaining the unsaturated linkage intermediate the ends of the aliphatic hydrocarbon.

The composition of matter may be produced by the general route of bromination of the allylic position of cyclododecene with N-bromosuccinimide followed by the dehydrobromination of the bromide product in the presence of a base such as quinoline and/or pyridine. The bromination step may suitably be accomplished in the presence of a peroxidic, free-radical initiator such as benzoyl peroxide, t-butyl peroxide, methyl ethyl ketone peroxide and similar peroxidic substances, or free radical initiators such as azo bis isobutyronitrile, or in the presence of ultraviolet light, and so on. The use of N-bromosuccinimide is essential if bromination of the cyclododecene at the allylic position is to be accomplished while leaving the unsaturated linkage unreacted.

The general process comprises the reaction of cyclododecene (trans- and/or cis-) with N-bromosuccinimide in an organic solvent medium, to produce a bromide intermediate. The organic liquid in which the reaction is carried out may be chosen from the group of chlorinated alkanes, such as carbon tetrachloride, ethylene dichloride, trichloroethane, etc. A suitable initiator such as benzoyl peroxide or t-butyl peroxide may be used to further the bromination reaction. The temperature of the bromination reaction is suitably maintained at or near the reflux temperature of the solvent chosen, and will generally occur within the range of 50° C. to 150° C. In the dehydrobromination reaction, the product of the bromination step above described is admixed with a reagent capable of removing the substituted bromine with the hydrogen from the 4 position. Suitable reagents are found in the strong bases such as NaOH, KOH, etc.; in the organic salts of the general formula ROM, where M is a metal such as Na, K, etc.; in the aliphatic or aromatic nitrogen-containing compounds which are reactive to strong acids, such as primary, secondary, and tertiary amines, piperidine, pyridine, quinoline, alkoxy amines, etc., or mixtures of these compounds. The dehydrobromination may be accomplished in any of the well-known ways, the temperatures and pressures to be employed being varied to suit the particular reagents being utilized. Purification of the diene product may be accomplished in any of the well-known ways, but the preferred embodiment will include removal of the hydrogen bromide-base reaction product and excess base. This can normally be achieved by washing the crude product with water and dilute mineral acid. Purification of the final liquid product is then achieved by distillation.

An example of the preparation of this new compound by the above-stated method is given below.

*Example I*

One molar part of a trans-cis mixture of cyclododecenes was admixed with one molar part of N-bromosuccinimide and two molar parts of benzoyl peroxide in solution in a carbon tetrachloride medium. The solution was heated to a temperature near the refluxing temperature to institute the reaction, then the heat was removed for several minutes and then reapplied to reflux the mixture for a period of about 1 hour. The reaction may be represented as follows:

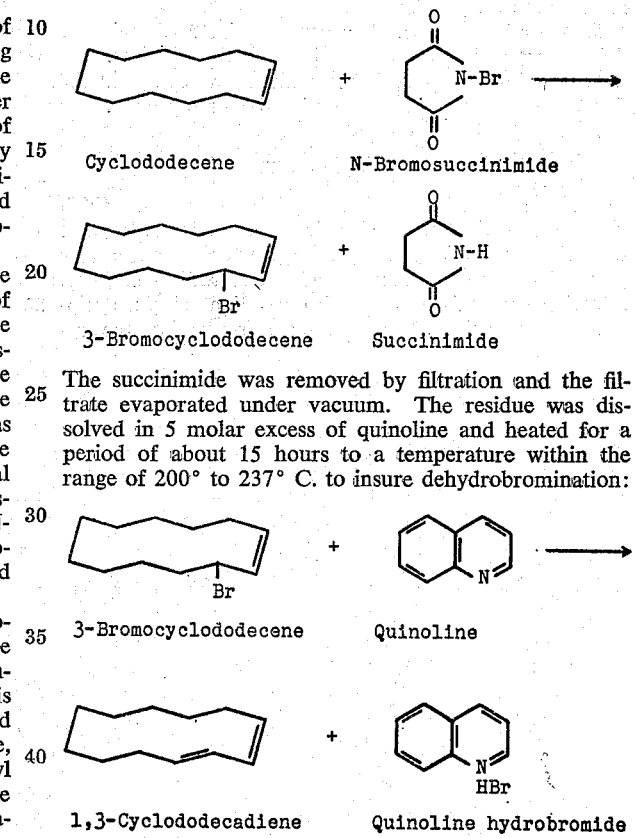

The succinimide was removed by filtration and the filtrate evaporated under vacuum. The residue was dissolved in 5 molar excess of quinoline and heated for a period of about 15 hours to a temperature within the range of 200° to 237° C. to insure dehydrobromination:

The product of the dehydrobromination was cooled and dissolved in several volumes of ether. The mixture was extracted twice with water, once with 10% sulfuric acid, once with dilute sodium bicarbonate solution, and finally with water to remove most of the nitrogen compounds. After drying over sodium sulfate, the product was evaporated to a dark oil and distilled. A fore-run containing unremoved quinoline and cyclododecene was removed as a product boiling within the range of 60.1° C. to 65.1° C. at 1 mm. The main portion of the essentially pure product is obtained as a colorless liquid boiling within the range of 65.1° C. to 65.5° C. at 1 mm. The ultraviolet absorption spectrum of the product shows maxima at 230 and 237 m$\mu$. Mass spectrographic analysis shows that contamination by masses other than 164, which is the calculated mass, is low. The NMR spectrum indicates that the required relative number of each hydrogen type is present for the configuration 1,3-cyclododecadiene. The infrared spectrum exhibits a strong trans band in the region of 965 cm.$^{-1}$ while absorption in the cis region, about 700 cm.$^{-1}$, is low and indefinitely attributable to a cis double bond. The 1,3-cyclododecadiene thus obtained possesses largely the trans-trans configuration.

Having disclosed in detail the method of producing this novel composition of matter along with a preferred manner of so doing, what I desire to protect by Letters Patent should be limited not by my specific example, but only by the appended claims.

I claim:
1. A new composition of matter: 1,3-cyclododecadiene.
2. A method of producing 1,3-cyclododecadiene which comprises reacting in a first liquid phase cyclododecene and N-bromosuccinimide to obtain 3-bromocyclododecene, and contacting the 3-bromocyclododecene with a liquid dehydrobrominating agent to produce 1,3-cyclododecadiene.
3. A method in accordance with claim 2 wherein the reaction with N-bromosuccinimide is started by a peroxidic free radical initiator.
4. A method in accordance with claim 3 wherein the initiator is benzoyl peroxide.
5. A method in accordance with claim 2 wherein the dehydrobromination is accomplished with quinoline.
6. A method in accordance with claim 2 wherein the dehydrobromination is accomplished with pyridine.
7. A method in accordance with claim 2 wherein the bromination and dehydrobromination are accomplished at reflux temperatures of said liquid phases.
8. A method of producing 1,3-cyclododecadiene which comprises mixing in an organic solvent one molar part of a cis-trans mixture of cyclododecene with one molar part of N-bromosuccinimide and a free radical initiator, refluxing said mixture until bromination of the cyclododecene is substantially complete, separating the resulting succinimide from the product solution, evaporating the separated solution to produce a solid residue, dissolving the residue in dehydrobrominating solvent and refluxing the solution until dehydrobromination is complete.
9. A method in accordance with claim 8 wherein the dehydrobromination product is purified by cooling said product and adding ether thereto, extracting the ether solution with water, 10% sulfuric acid, dilute $NaHCO_3$, and water, and then drying the raffinate to obtain highly purified 1,3-cyclododecadiene.
10. A method in accordance with claim 8 wherein the bromination solvent is carbon tetrachloride.
11. A method in accordance with claim 10 wherein the dehydrobromination solvent is quinoline.
12. A method in accordance with claim 11 wherein the free radical initiator is benzoyl peroxide.

References Cited in the file of this patent

UNITED STATES PATENTS

| | | |
|---|---|---|
| 2,978,464 | Wiese et al. | Apr. 4, 1961 |
| 2,979,544 | Wilke | Apr. 11, 1961 |
| 3,007,974 | Lippincott | Nov. 7, 1961 |
| 3,009,001 | Crain et al. | Nov. 14, 1961 |
| 3,025,329 | Gleason | Mar. 13, 1962 |